United States Patent
Kusano

(10) Patent No.: US 6,211,281 B1
(45) Date of Patent: Apr. 3, 2001

(54) PNEUMATIC TIRE FOR HEAVY DUTY USE

(75) Inventor: Tomohiro Kusano, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/229,739

(22) Filed: Jan. 14, 1999

(30) Foreign Application Priority Data

Jan. 30, 1998 (JP) .................................................. 10-018678

(51) Int. Cl.$^7$ ................................ C08J 5/10; C08K 3/04; C08L 9/00
(52) U.S. Cl. .......................... 524/496; 524/493; 524/495; 152/905
(58) Field of Search .................................... 524/492, 493, 524/494, 495, 496; 152/905

(56) References Cited

U.S. PATENT DOCUMENTS 5,856,393 * 1/1999 Matsue et al. ........................ 524/493

* cited by examiner

*Primary Examiner*—James J. Seidleck
*Assistant Examiner*—U. K. Rajguru
(74) *Attorney, Agent, or Firm*—Sughrue, Mion, Zinn, Macpeak & Seas, PLLC

(57) ABSTRACT

There is disclosed a pneumatic tire for heavy duty use having a tread which is composed of a rubber composition comprising 100 parts by weight of an (A) isoprene-based rubber and 30 to 70 parts by weight of (B) carbon black which has a nitrogen-adsorption specific surface area (BET) of 120 to 160 m$^2$/g; a dibutyl phthalate absorption amount (DBP) of 80 to 130 ml/100 g; a most frequent value of aggregate diameter distribution ($D_{st}$) of 60 to 70 nm; and a half peak width ($\Delta D_{50}$) of 65 to 80 nm, and as the case may be, 3 to 20 parts by weight of (C) silica which has a nitrogen-adsorption specific surface area (BET) of 210 to 260 m$^2$/g; and an oil absorption amount of 200 to 260 ml/100 g. The above pneumatic tire is capable of enhancing the low heat-buildup property without detriment to the abrasion resistance of a tread rubber, and favorably reconciling both the low heat-buildup property and the abrasion resistance of itself.

7 Claims, No Drawings

PNEUMATIC TIRE FOR HEAVY DUTY USE

BACKGROUND OF THE INVENTION

1. Field of the Invention

The present invention relates to a pneumatic tire for heavy duty use. More particularly, the present invention pertains to a pneumatic tire for heavy duty use which is particularly well suited for constructional vehicles and the like and in which a carbon black-reinforced rubber composition is employed in a tread of the tire, said rubber composition being excellent in abrasion resistance and heat buildup performance (property of exhibiting low heat-buildup).

2. Description of the Related Arts

In order to improve the abrasion resistance of tread rubber of pneumatic tires, such improvements have heretofore been made by calling attention to the colloidal characteristics of reinforcing carbon black such as its particle diameter and structure (aggregates) For the improvement in carbon black for pneumatic tires, there is adopted in general, a method in which the interaction between carbon black and a polymer is enhanced by using carbon black having small particle sizes and high structures, and thus the reinforcing property is improved by the enhanced interaction therebetween. There is also adopted a method in which the blending amount of carbon black is increased to improve the abrasion resistance of the tread ruber.

In general, however, fine graining of carbon black is liable to deteriorate the low heat-buildup property, that is, heat buildup performance of a rubber composition. Thus, fine-grained carbon black gives rise to a serious problem when used for a heavy duty pneumatic tire such as a tire for a truck and a bus that are in use under severe conditions in many cases. In addition, the use of excessively fine-grained carbon black in a rubber composition brings about such problems as an increase in the amount of the phase wherein carbon black and a polymer are bound to each other, namely so-called carbon gel, accompanied by an increase in the viscosity of an unvulcanized rubber composition, and the resultant marked deterioration of the processability thereof. The use of the said carbon black further causes such a problem that the carbon black is poorly dispersed in a rubber composition with the result that the abrasion resistance thereof is adversely decreased.

In addition to the foregoing, when carbon black as a reinforcer is added to rubber in an excessive amount, there are raised a problem that the resultant rubber composition is unreasonably hardened, thereby making it difficult to carry out industrial processing, and at the same time, a problem in the physical properties of the rubber composition including inferior dispersion of the carbon black in the rubber composition and a failure to contrive enhancement of the abrasion resistance.

On the one hand, the use of carbon black having a high structure causes such a problem as unreasonable increase in the elastic modulus of the rubber composition, accompanied with deterioration of its fatigue resistance.

It follows from what has been mentioned hereinbefore, that the conventional methods for enhancing the abrasion resistance of a rubber composition by means of carbon black exert evil influences upon its low heat-buildup property, and particularly in the case of a heavy duty pneumatic tire, there has been an inevitable limit to the effect on improvement in its abrasion resistance.

On the other hand, there has recently been proposed as well a method for decreasing the proportion of large-diameter components of the aggregate that are considered to be the factors of inhibiting rubber enhancement, by sharpening the aggregate distribution of the primary particles of carbon black (refer to Japanese Patent Application Laid-Open Nos. 264647/1988 (Sho-63), 279624/1994 (Hei-6), etc.

SUMMARY OF THE INVENTION

Under such circumstances, a general object of the present invention is to provide a pneumatic tire for heavy duty use which is remarkably improved in low heat-buildup property without worsening the abrasion resistance of a tread rubber.

In view of the above, intensive research and investigation were accumulated by the present inventors in order to develop a pneumatic tire for heavy duty use which has the above-mentioned favorable properties. As a result, it has been found that although further enhancement of abrasion resistance of a tread rubber is not expectable from the use of merely fine-grained carbon black owing to the deteriorated low heat-buildup property of the rubber and also the worsened dispersibility of carbon black, such deterioration of low heat buildup property of the rubber as well as the worsening of dispersibility of carbon black can favorably be suppressed and at the same time, the abrasion resistance of the tread rubber can markedly be improved by expanding the width of aggregates distribution simultaneously with the fine-graining of carbon black. Further it has been found that the object of the present invention can be achieved by a pneumatic tire for heavy duty use employing a specific rubber composition which comprises an isoprene-based rubber and carbon black having specific properties, and as the case may be, silica having specific properties, each of the components being blended at a prescribed proportion. The present invention has been accomplished on the basis of the above-mentioned findings and information.

That is to say, the present invention provides a pneumatic tire for heavy duty use having a tread which is composed of a rubber composition comprising 100 parts by weight of an (A) isoprene-based rubber and 30 to 70 parts by weight of (B) carbon black which has a nitrogen-adsorption specific surface area (BET) of 120 to 160 $m^2/g$; a dibutyl phthalate absorption amount (DBP) of 80 to 130 ml/100 g; a most frequent value of aggregate diameter distribution ($D_{st}$) of 60 to 70 nm; and a half peak width ($\Delta D_{50}$) of 65 to 80 nm; and as the case may be, 3 to 20 parts by weight of (C) silica which has a nitrogen-adsorption specific surface area (BET) of 210 to 260 $m^2/g$; and an oil absorption amount of 200 to 260 ml/100 g.

DESCRIPTION OF THE PREFERRED EMBODIMENTS

In the rubber composition to be employed as a tread in the pneumatic tire for heavy duty use according to the present invention, the isoprene-based rubber to be used as the component (A) is exemplified by natural rubber and polyisoprene (IR) which is obtained by the polymerization of isoprene monomer. Among the polyisoprene which is a synthetic rubber, the polyisoprene in which cis 1,4-bond occupies about 98% of all the bonds has a molecular structure extremely similar to that of natural rubber, and thus has fundamental characteristics akin to those of natural rubber.

In the above-mentioned rubber composition, the carbon black to be used as the component (B) needs to have the characteristics as described in the following.

In the first place, the nitrogen-adsorption specific surface area (BET) of the component (B) as measured in accordance with ASTM D-3037-88, should be in the range of 120 to 160 m$^2$/g. The BET value, when being less than 120 m$^2$/g, results in failure to assure sufficient abrasion-resistance of a tread rubber, whereas the BET value, when being more than 160 m$^2$/g, leads to deterioration of low heat-buildup property. Taking into consideration both the abrasion resistance and the low heat-buildup property, the BET value is preferably in the range of 125 to 145 m$^2$/g.

In addition, the aforesaid dibutyl phthalate absorption amount (DBP) thereof as measured in accordance with JIS K 6221-1982 (Method A), should be in the range of 80 to 130 ml/100 g. The DBP value, when being less than 80 ml/100 g, results in failure to assure sufficient abrasion-resistance of a tread rubber, whereas the DBP value, when being more than 130 ml/100 g, leads to deterioration of low heat-buildup property. Taking into consideration both the abrasion resistance and the low heat-buildup property, the DBP value is preferably in the range of 85 to 120 ml/100 g.

Moreover, the most frequent value of aggregate diameter distribution ($D_{st}$) thereof should be in the range of 60 to 70 nm. The $D_{st}$ value, when being less than 60 nm, leads to deterioration of low heat-buildup property, whereas the $D_{st}$ value, when being more than 70 nm, results in failure to sufficiently exhibit the effect on improvement in abrasion resistance of a tread rubber. Further, the half peak width ($\Delta D_{50}$) thereof should be in the range of 65 to 80 nm. The $\Delta D_{50}$ value, when being less than 65 nm, leads to insufficient effect on improvement in low heat-buildup property, whereas the $\Delta D_{50}$ value, when being more than 80 nm, results in failure to sufficiently exhibit the effect on improvement in abrasion-resistance of a tread rubber.

The above-mentioned $D_{st}$ and $\Delta D_{50}$ values were measured by means of centrifugal sedimentation method by the use of a disk centrifuge photosedimentometer (DCP) [manufactured by Joyce Loebl Corporation] in accordance with the procedures as described hereunder. In the first place, a sample of dried carbon black was accurately weighed and mixed with 20% by weight of an aqueous solution of ethanol containing a slight amount of a surface active agent to prepare a dispersion of the carbon black in a concentration of 50 mg/l. Then the carbon black was sufficiently dispersed in the resultant dispersion by the use of ultrasonic wave to prepare a sample solution. The number of revolutions of the DCP was set to 8000 r.p.m. Subsequently 10 ml of a spinning liquid (distilled water) was added to the DCP, and thereafter one ml of a buffer solution (20% by weight of an aqueous solution of ethanol) was injected thereto. Subsequently 0.5 ml of the sample solution thus prepared was added thereto with a syringe. Thus an aggregate diameter distribution curve was drawn up from the data obtained by simultaneous sedimentation method.

From the curve thus drawn up, the stokes-corresponding diameter indicating a most frequent value (maximum frequency) was defined as $D_{st}$. The difference between the larger diameter and the smaller diameter each indicating the same and half the aforesaid diameter indicating a most frequent value, was defined as $\Delta D_{50}$.

In the rubber composition according to the present invention, the carbon black as the coponent (B) is blended in an amount of 30 to 70 parts by weight based on 100 parts by weight of the isoprene-based rubber. The blending amount of the carbon black, when being less than 30 parts by weight based on the same, results in failure to sufficiently exhibit the reinforcing effect and in inferior abrasion resistance, whereas the blending amount thereof, when being more than 70 parts by weight based on the same, gives rise to deterioration of low heat-buildup property. Taking into consideration the reinforcing effect, the low heat-buildup property and the like factors, the blending amount of the carbon black is preferably in the range of 40 to 60 parts by weight based on 100 parts by weight of the isoprene-based rubber.

In the rubber composition according to the present invention, silica having the following characteristics as the component (C) may be incorporated therein, as desired, for the purpose of further improving the physical properties of the composition.

The silica should have a nitrogen-adsorption specific surface area (BET) in the range of 210 to 260 m$^2$/g, when measured in accordance with ASTM D4820-93 after dried at 300° C. for one hour. The BET value, when being less than 210 m$^2$/g, brings about insufficient effect on improvement in abrasion resistance, whereas the BET value, when being more than 260 m$^2$/g, gives rise to an increase in the viscosity of the rubber composition, accompanied with deterioration of the workability at the time of manufacturing tires. Taking into consideration the effect on improvement in abrasion resistance, the workability at the time of manufacturing tires and the like factors, the BET value is preferably in the range of 210 to 240 m$^2$/g.

Moreover, the silica should have an oil absorption amount in the range of 200 to 260 ml/100 g as measured in accordance with ASTM D2414-93. The oil absorption amount, when being less than 200 ml/100 g, makes it difficult to favorably maintain the balance between the low heat buildup property and abrasion resistance of the rubber composition, whereas the oil absorption amount, when being more than 260 ml/100 g, brings about insufficient effect on improvement in low heat-buildup property. Taking into consideration the balance between low heat-buildup property and abrasion resistance of the rubber composition, the effect on improvement in low heat-buildup property and the like factors, the oil absorption amount is preferably in the range of 220 to 240 ml/100 g.

The silica as the component (C) which is used when desired, is blended in an amount in the range of 3 to 20 parts by weight based on 100 parts by weight of the isoprene-based rubber. The amount of said silica, when being outside the above-mentioned range, results in failure to sufficiently exert the effect on improvement in low heat-buildup property and/or abrasion resistance of the rubber. From the viewpoint of the effect on these improvements, the silica is blended preferably in an amount in the range of 5 to 15 parts by weight based on the same.

The total of the amounts of the carbon black as the component (B) and the silica as the component (C) is in the range of preferably 40 to 80 parts by weight, particularly preferably 40 to 70 parts by weight based on 100 parts by weight of the isoprene-based rubber as the component(A) from the aspect of the balance between the abrasion resistance and low heat-buildup property.

The pneumatic tire for heavy duty use according to the present invention can be manufactured by a process which comprises the steps of blending the above-described isoprene-based rubber as the component (A), the carbon black as the component (B) and the silica as the component (C) which is incorporated as desired, each at a prescribed proportion; further incorporating into the resultant blend, any of additives, assistants and fillers that are customarily used such as a vulcanizing agent, a vulcanization accelerator, a vulcanization assistant, an antioxidant, an age resister, a softening agent and the like each being properly selected to prepare a rubber composition; making the rubber composition thus prepared into a tread rubber; and vulcanizing molding a material to be vulcanized containing the tread rubber in accordance with ordinary vulcanizing conditions.

To summarize the advantages and the working effects of the pneumatic tire for heavy duty use according to the present invention, said pneumatic tire is capable of enhancing the low heat-buildup property without detriment to the abrasion resistance of a tread rubber and at the same time, favorably reconciling both the low heat-buildup property and the abrasion resistance thereof.

In the following, the present invention will be described in more detail with reference to comparative examples and working examples, which however shall not limit the present invention thereto.

EXAMPLES 1 & 2 AND COMPARATIVE EXAMPLES 1 TO 5

Various rubber compositions were prepared on the basis of the blending formulation as given in Table 1. Subsequently sample tires for testing (off the road tire: 3700R57) were prepared by using the resultant rubber compositions as tread rubber in accordance with ordinary vulcanizing conditions.

The sample tires for testing thus prepared were subjected to each of performance tests. The results thereof are given in Table 1.

(1) Low Heat-buildup Property

The low heat-buildup property of each of the sample tires was tested by drum testing at a constant speed under step load conditions, while a measurement was made of the temperature at a definite position inside a tread portion. The results in Table 1 are given as an index on the basis of a reference index of 100 in Comparative Example 1, which mean that the smaller the index, the lower the temperature rise due to heat generation and better the low heat-buildup property.

(2) Abrasion Resistance

The abrasion resistance of each of the sample tires was tested by measuring the depths of remaining grooves at several positions of the tread after 2000 hours of test running. The abrasion resistance thereof was determined by the following formula.

Abrasion resistance=[(average depth of remaining grooves in a sample tire tested)/(depth of remaining groove in Comparative Example 1)]×100

The results in Table 1 mean that the greater the value of abrasion resistance, the better the abrasion resistance.

TABLE 1

|  | Example | | Comparative Example | | | | |
| --- | --- | --- | --- | --- | --- | --- | --- |
|  | 1 | 2 | 1 | 2 | 3 | 4 | 5 |
| BLENDING FORMULATION (part/s by weight) | | | | | | | |
| Natural Rubber | 100 | 100 | 100 | 100 | 100 | 100 | 100 |
| Carbon Black | 50 | 40 | 50 | 45 | 50 | 50 | 40 |
| Silica | — | 10 | — | — | — | — | 10 |
| Age Register 6C[(1)] | 1 | 1 | 1 | 1 | 1 | 1 | 1 |
| Stearic Acid | 2 | 2 | 2 | 2 | 2 | 2 | 2 |
| Wax | 2 | 2 | 2 | 2 | 2 | 2 | 2 |
| Zinc Oxide | 3 | 3 | 3 | 3 | 3 | 3 | 3 |
| Vulcanization Accelerator CZ[(2)] | 1 | 1.1 | 1 | 1 | 1 | 1 | 1.1 |
| Sulfur | 1.5 | 1.5 | 1.5 | 1.5 | 1.5 | 1.5 | 1.5 |
| CARBON BLACK PROPERTIES | | | | | | | |
| BET ($m^2/g$) | 130 | 130 | 145 | 145 | 140 | 136 | 145 |
| DBP (ml/100 g) | 95 | 95 | 90 | 90 | 97 | 92 | 90 |
| $D_{zt}$ (nm) | 65 | 65 | 50 | 50 | 68 | 54 | 50 |
| $\Delta D_{50}$ (nm) | 75 | 75 | 60 | 60 | 85 | 86 | 60 |
| SILICA PROPERTIES | | | | | | | |
| BET ($m^2/g$) | — | 230 | — | — | — | — | 170 |
| Oil Absorption Amount (ml/100 g) | — | 230 | — | — | — | — | 160 |
| EVALUATION | | | | | | | |
| Low Heat-Buildup Property | 92 | 95 | 100 | 91 | 104 | 98 | 103 |
| Abrasion Resistance | 100 | 117 | 100 | 90 | 102 | 100 | 115 |

Remarks
[(1)]Age Resister: N-phenyl-N'-(1,3-dimethylbutyl)-p-phenylenediamine
[(2)]Vulcanization Accelerator: N-cyclohexyl-2-benzo-thiazylsulfenamide

What is claimed is:

1. A pneumatic tire for heavy duty use having a tread which is composed of a rubber composition comprising 100 parts by weight of an (A) isoprene-based rubber and 30 to 70 parts by weight of (B) carbon black which has a nitrogen-adsorption specific surface area (BET) of 120 to 160 $m^2/g$; a dibutyl phthalate absorption amount (DBP) of 80 to 130 ml/100 g; a most frequent value of aggregate diameter distribution ($D_{st}$) of 60 to 70 nm; and a half peak width ($\Delta D_{50}$) of 65 to 80 nm.

2. The pneumatic tire for heavy duty use according to claim 1, wherein the carbon black as the component (B) has a nitrogen-adsorption specific surface area (BET) of 125 to 145 m²/g; and a dibutyl phthalate absorption amount (DBP) of 85 to 120 ml/100 g.

3. The pneumatic tire for heavy duty use according to claim 1, wherein the rubber composition comprises 100 parts by weight of the (A) isoprene-based rubber and 40 to 60 parts by weight of the (B) carbon black.

4. A pneumatic tire for heavy duty use having a tread which is composed of a rubber composition comprising 100 parts by weight of an (A) isoprene-based rubber, 30 to 70 parts by weight of (B) carbon black which has a nitrogen-adsorption specific surface area (BET) of 120 to 160 m²/g; a dibutyl phthalate absorption amount (DBP) of 80 to 130 ml/100 g; a most frequent value of aggregate diameter distribution ($D_{st}$) of 60 to 70 nm; and a half peak width ($\Delta D_{50}$) of 65 to 80 nm, and 3 to 20 parts by weight of (C) silica which has a nitrogen-adsorption specific surface area (BET) of 210 to 260 m²/g; and an oil absorption amount of 200 to 260 ml/100 g.

5. The pneumatic tire for heavy duty use according to claim 4, wherein the carbon black as the component (B) has a nitrogen-adsorption specific surface area (BET) of 125 to 145 m²/g; and a dibutyl phthalate absorption amount (DBP) of 85 to 120 ml/100 g, and the silica as the component (C) has a nitrogen-adsorption specific surface area (BET) of 210 to 240 m²/g; and an oil absorption amount of 220 to 240 ml/100 g.

6. The pneumatic tire for heavy duty use according to claim 4, wherein the rubber composition comprises 100 parts by weight of the (A) isoprene-based rubber, 40 to 60 parts by weight of the (B) carbon black and 5 to 15 parts by weight of the (C) silica.

7. The pneumatic tire for heavy duty use according to claim 4, wherein the rubber composition comprises 100 parts by weight of the (A) isoprene-based rubber and 40 to 80 parts by weight of the total amount of the (B) carbon black and the (C) silica.

* * * * *